Figure 1:
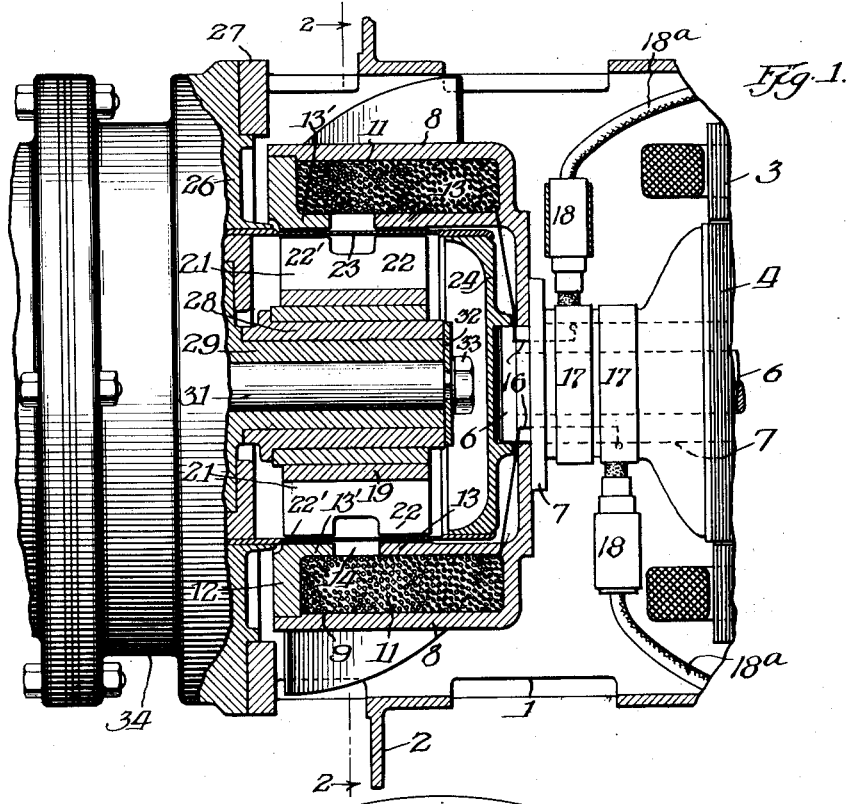

May 30, 1933.  C. E. L. LIPMAN  1,911,960
MAGNETIC CLUTCH
Filed Aug. 8, 1930

Inventor:
Carl E. L. Lipman
By Wilson, Dowell, McCanna & Pehm
Attys.

Witness:
R. B. Davison

Patented May 30, 1933

1,911,960

UNITED STATES PATENT OFFICE

CARL E. L. LIPMAN, OF CHICAGO, ILLINOIS, ASSIGNOR TO LIPMAN PATENTS CORPORATION, OF CHICAGO, ILLINOIS, A CORPORATION OF DELAWARE

MAGNETIC CLUTCH

Application filed August 8, 1930. Serial No. 473,799.

This invention relates to magnetic clutches and to such a clutch that is particularly well suited for driving sealed refrigerating compressors although it is manifest that the invention may be put to many other uses.

It is the purpose of this invention to provide a magnetic clutch which is simple in construction and efficient in operation.

The use of a magnetic clutch to drive a mechanism inclosed in a sealed casing involves difficulties one of which is the heating of the casing. This heating is usually due to the reversal of lines of magnetic flux through the casing.

In the usual construction of this type clutch the driven member of the clutch is positioned within the casing and is in the form of a magnetic member which provides a plurality of low resistance paths for the magnetic flux through the casing from one side thereof to the other between diametrically opposite poles of the driving member the latter poles being arranged in a series of alternate polarity around the driven member. The lines of magnetic flux through successive paths of the driven member flow in opposite directions due to the arrangement of the poles of the driving member. Upon rotation of the driven and driving elements any given point of the casing therebetween is subject to lines of magnetic force flowing first in one direction and then in the other direction.

In some instances this heating is eliminated by making the casing of a material having a high electrical resistance. This practice, however, usually results in the use of a metal which decreases the efficiency of the magnetic clutch.

In accordance with this invention the driving and driven elements of the clutch are so constructed and arranged with respect to the sealing casing that the lines of magnetic flux flow continuously in one direction through these parts and through the casing which separates the driven from the driving element. Accordingly the generation of heat caused by the reversal of flux through this shell is eliminated and the efficiency of the clutch increased.

Figure 2:
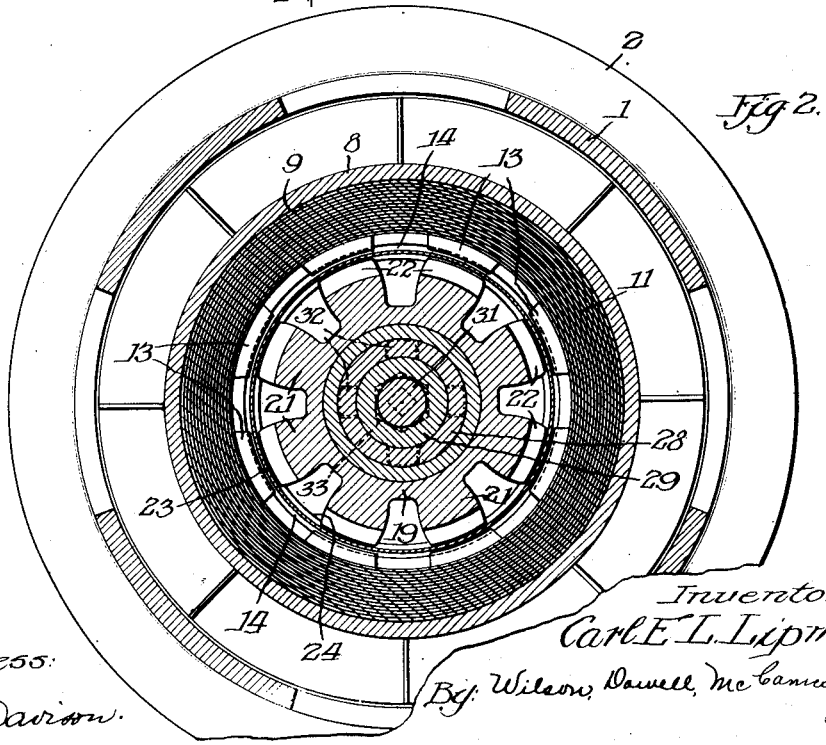

A better understanding will be had of this invention from the following description given in connection with the drawing, in which:

Fig. 1 is a side elevation partly in vertical section illustrating a clutch embodying the principles of this invention applied between a motor and refrigerator compressor, and Fig. 2 is a vertical section on line 2—2 of Fig. 1.

In the illustrated form of this invention a magnetic clutch embodying the principles of this invention is shown as being applied as the connecting member between a motor and a refrigerator compressor, the motor and compressor being carried upon a single housing so constructed that either the motor and the driving element of the clutch may be removed as a unit of the compressor and the driven member and compressor may be removed as a unit. It is obvious that the application of this invention is merely illustrative of the many uses to which the clutch may be put.

Referring particularly to the drawing the entire mechanism is supported from a substantially cylindrical housing 1, having an intermediate laterally extending flange 2, by which the housing may be secured to a suitable support if desired. To one end of the housing is secured a motor 3, a portion only of which is shown, having an armature 4 journalled upon a stationary shaft 6 through the medium of a bearing sleeve 7. To the inner end of bearing sleeve 7 is secured the shell or housing 8 which constitutes the driving member of the clutch. The shell 8 is in the form of a hollow ring and is provided with an interior annular chamber 9 within which is secured the clutch energizing coil 11 with its axis coincident with the axis of rotation of the clutch. The coil is held within the chamber 9 by an end plate 12 secured to the shell 8 by any suitable means. The interior wall of the shell 8 is shorter than the exterior wall and terminates in a plurality of pole pieces 13. The interior wall of the end plate 12 also terminates in a series of pole pieces 13' spaced from the pole pieces 13 leaving an air gap 14 therebetween. The poles 13 and 13' are of opposite polarity and are arranged in two annuli.

As can be seen from the drawing the poles 13 and 13' are arranged substantially parallel to the axes of rotation of the clutch members. The flux emanating therefrom will therefore be substantially parallel to the axis of rotation.

The energizing coil 11 may be connected by lead 16 to slip rings 17 upon which a pair of brushes 18 contact, thus permitting current to be supplied to the coil from any suitable source of exciting current through leads 18ª connected to brushes 18.

The gap 14 between the pole pieces of the driving member is bridged by a driven member 19, the latter member being provided with a plurality of poles 21 equal in number to the poles 13 each pole being provided with a pair of spaced projecting portions 22 and 22' which extend into proximity to the pole pieces 13 and 13' respectively. The portions 22 and 22' thereby provide a path for the flux between poles 13 and 13'.

The pole pieces 13 and 13', 22 and 22' are spaced sufficiently from each other respectively to permit the insertion of a relatively stationary sealing casing or shell 23 preferably formed of some non-magnetic material and closed at one end by an end piece 24. The shell is secured at its outer end to a plate 26 secured to a ring 27 which is in turn secured to the housing 1. The shell 23 thus seals the driven clutch member 21 and the compressor unit. The clutch member 21 is secured to a sleeve 28 for rotation therewith, the sleeve being journalled upon a flanged standard 29. The sleeve 28 is also rotatively attached to compressor shaft 31 through the medium of a disc 32 and nut 33. The compressor may be of any desired type and is carried within the compressor housing 34.

It follows from the above that upon energization of the coil 11 a magnetic field will be set up which will cause either poles 13' or 13 to be the north poles and the remaining set to be south poles according to the polarity of the coil.

It is obvious that were it not for the pole formation the flux through the coil would be uniform but due to the polar formation the field is concentrated at the poles. The driven member 21 constitutes a low resistance path for the passage of the flux between poles 13 and 13'. It is apparent therefore that when the coil 11 is energized the magnetic field established thereby will cause the driven member to be rotated with the driving member. The latter is secured to sleeve 7 and is rotated by the motor armature 4.

It is to be particularly noted that the magnetic field will always be from pole 13 to 13' or vice versa and that the flux, which is substantially parallel to the axes of rotation of the clutch except where it passes through the shell, will never be reversed through shell 23 but will always be in the same direction.

It can be seen from the above description that a highly efficient clutch is provided in which the heating effect due to the reversal of magnetic flux is eliminated.

It is obvious that a clutch constructed in accordance with this invention may be used in various places and that the construction heretofore described may be varied in many details without departing from the spirit and scope of the invention as defined in the claims appended hereto.

I claim:

1. In a magnetic clutch drive, a driving element, a driven element and a sealing casing enclosing one of said elements, one of said clutch elements being in the form of a hollow ring providing a substantially closed coil chamber having an open end, an end plate for closing said chamber, said element and end plate terminating in a plurality of pairs of alined spaced magnetic poles of opposite polarity, the opposed poles being arranged parallel to the axis of rotation of said clutch and surrounding said casing, a magnet coil disposed within said hollow ring, the other of said clutch elements being disposed within said casing and having a plurality of spaced alined poles parallel to the axis of rotation and projecting into proximity to the poles of the outer member.

2. In a magnetic clutch drive, a driving element and a driven element, one of said clutch elements being in the form of a hollow ring providing a substantially closed coil chamber and having a removable end for closing said chamber, said clutch element when assembled terminating in a plurality of pairs of aligned spaced magnetic poles of opposite polarity, the opposed poles being arranged parallel to the axis of rotation of said clutch, a magnet coil disposed within said hollow ring, the other of said clutch elements being disposed within the first mentioned element and having a plurality of spaced aligned poles parallel to the axis of rotation and projecting into proximity to the poles of the outer member.

In witness of the foregoing I affix my signature.

CARL E. L. LIPMAN.